United States Patent [19]

Kivela

[11] 4,314,341
[45] Feb. 2, 1982

[54] AIRCRAFT AUTOMATIC PILOT WITH AUTOMATIC EMERGENCY DESCENT CONTROL APPARATUS

[75] Inventor: Gary G. Kivela, Phoenix, Ariz.

[73] Assignee: Sperry Corporation, New York, N.Y.

[21] Appl. No.: 114,785

[22] Filed: Jan. 24, 1980

[51] Int. Cl.³ .............................................. G05D 1/08
[52] U.S. Cl. .................................. 364/433; 244/180; 244/181; 340/27 R
[58] Field of Search ................ 364/433, 434; 244/180, 244/181, 183, 194, 195; 73/178 T, 179; 340/27 NA, 27 R

[56] References Cited

U.S. PATENT DOCUMENTS

| 3,510,090 | 5/1970 | Falkner et al. | 244/180 |
| 3,578,269 | 5/1971 | Kramer et al. | 244/180 |
| 3,899,661 | 8/1975 | Lehfeldt | 364/433 |
| 3,947,808 | 3/1976 | Bateman | 244/180 |
| 4,021,009 | 5/1977 | Baker et al. | 364/433 |
| 4,029,271 | 6/1977 | Murphy et al. | 364/433 |
| 4,114,842 | 9/1978 | Hofferber et al. | 364/433 |

Primary Examiner—Errol A. Krass
Assistant Examiner—Gary Chin
Attorney, Agent, or Firm—Howard P. Terry

[57] ABSTRACT

An automatic flight control system includes an automatic emergency descent mode initiated upon cabin decompression at high altitudes. Automatic safe capture of maximum descent rate and automatic flare to a safe altitude are provided, together with an automatic turn off the course existing at mode initiation.

8 Claims, 3 Drawing Figures

AIRCRAFT AUTOMATIC PILOT WITH AUTOMATIC EMERGENCY DESCENT CONTROL APPARATUS

BACKGROUND OF THE INVENTION

1. Field of the Invention

The invention relates to the safe automatic flight control of aircraft capable of very high altitude operation and more particularly concerns improvements in aircraft flight control systems assuring safe recovery of aircraft altitude and flight path in the case of explosive decompression of the air within the cabin structure which might render the flight crew unconscious before emergency manual descent procedures can be initiated.

2. Description of the Prior Art

While aircraft have been successfully flown to safe altitudes and even to successful landings after serious or sudden loss of cabin air pressure at high altitudes by alert human pilots, their successes have normally been attributed in no large measure to tenuous fortune rather than to inherently appropriate design of the craft or of its control systems. Even a pilot with improbably high immunity to such an emergency situation would have considerable difficulty in safely solving the recovery problem. The latter requires pitching the aircraft over so as immediately to capture the maximum design air speed tolerable by the craft without dangerous or sustained over-shoot so as to avoid endangering the structural integrity of the aircraft. At the same time, it is desirable for the pilot to turn the aircraft off course and out of the airway so that descent of the craft will not interfere with other craft using the airway in the normal manner. Numerous other problems also evidently face the pilot in such an emergency.

SUMMARY OF THE INVENTION

In the event of cabin pressure loss at high altitude, the invention automatically commands the pitch attitude of the craft to capture and to maintain air speed at the manufacturer's maximum design air speed $V_{MO}$ for the craft. It is also desired to set speed brakes and the throttles to establish maximum rate of descent without exceeding $V_{MO}$. Additionally, a turn is automatically commanded to turn the craft to a new heading preferably as nearly as possible at right angles to the airway course originally being flown. This latter maneuver desirably takes the craft out of the vertical plane of the airway and hence out of the path of other flights at various altitudes along that airway. Upon reaching the safe altitude, the craft is automatically returned asymptotically to its level flight attitude through operation of the altitude control portion of the autopilot in a conventional manner. The new altitude and heading are maintained until further action may be taken by the flight crew.

DESCRIPTION OF THE PREFERRED EMBODIMENTS

Figure 1:
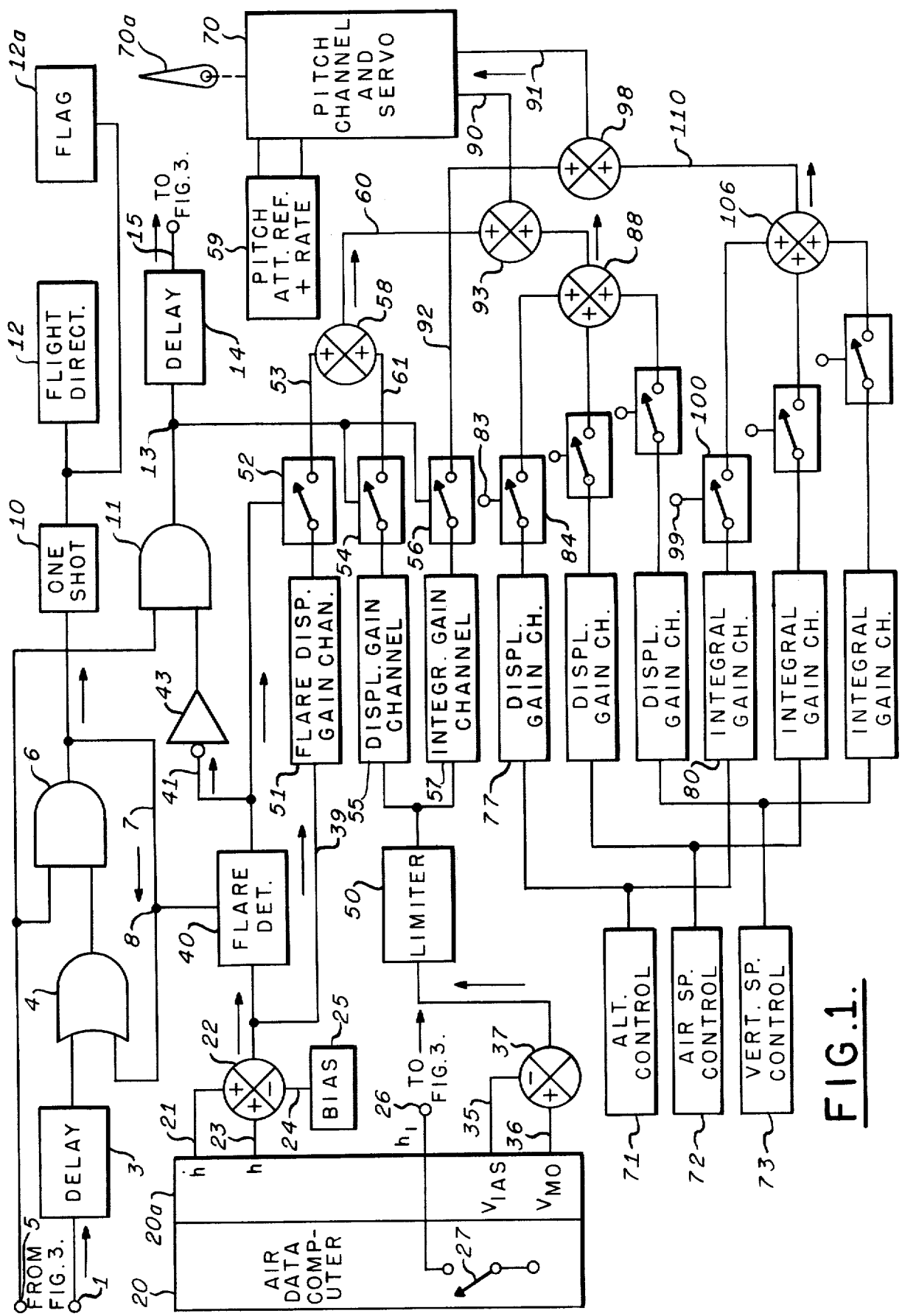
FIG. 1 is a block diagram of the pitch channel of an aircraft automatic pilot including the emergency descent control apparatus of the present invention.
Figure 2:
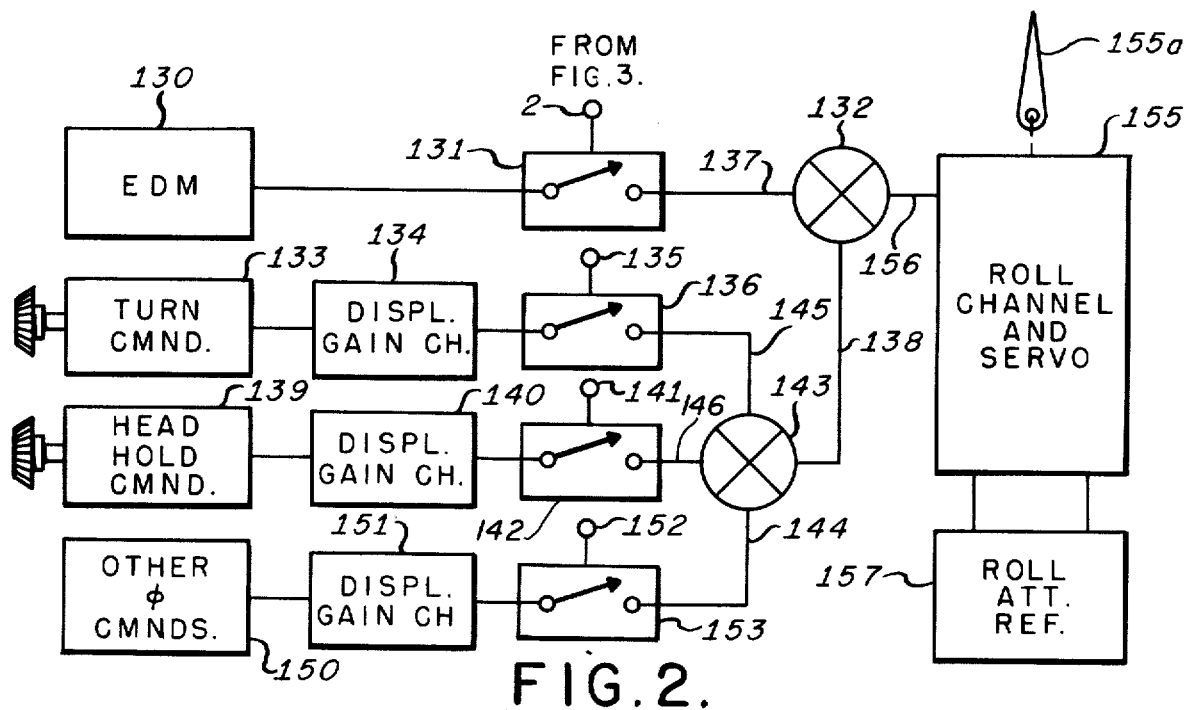
FIG. 2 is a block diagram of the roll channel of the autopilot including elements of the emergency descent mode apparatus operable therein.

FIG. 1 includes a schematic illustration of the generally conventionally pitch channel of an aircraft automatic flight control system, including a conventional air data computer 20 for providing not only the inputs for the present invention but also for providing conventional autopilot inputs such as altitude control 71, air speed control 72, and vertical speed control 73. Conventional pitch attitude and rate stabilization references 59 are also provided and all operate in a conventional manner to control the aircraft in pitch through servo 70 and elevator surface 70a. The pitch control system as disclosed in FIG. 1, as well as the roll channel of FIG. 2, is provided with various enabling and disengagement switches and switching elements which are to be cooperatively controlled upon initiation and operation of the novel automatic emergency descent mode of the present invention. These switches are conventional transistor switches but are illustrated herein as mechanical for ease of understanding.

FIG. 2 schematically illustrates the roll channel 155 of the autopilot for controlling ailerons 155a, including conventional command data inputs such as turn command controller 133, heading select and hold controller 139, and other path command sources 150 such as navigation radios. Roll attitude and rate stabilization reference 157 is also conventional. The craft roll control system as disclosed in FIG. 2 is also provided with various enabling and disengaging switches and switching elements used during initiation and operation of the novel automatic emergency descent mode apparatus.

Figure 3:
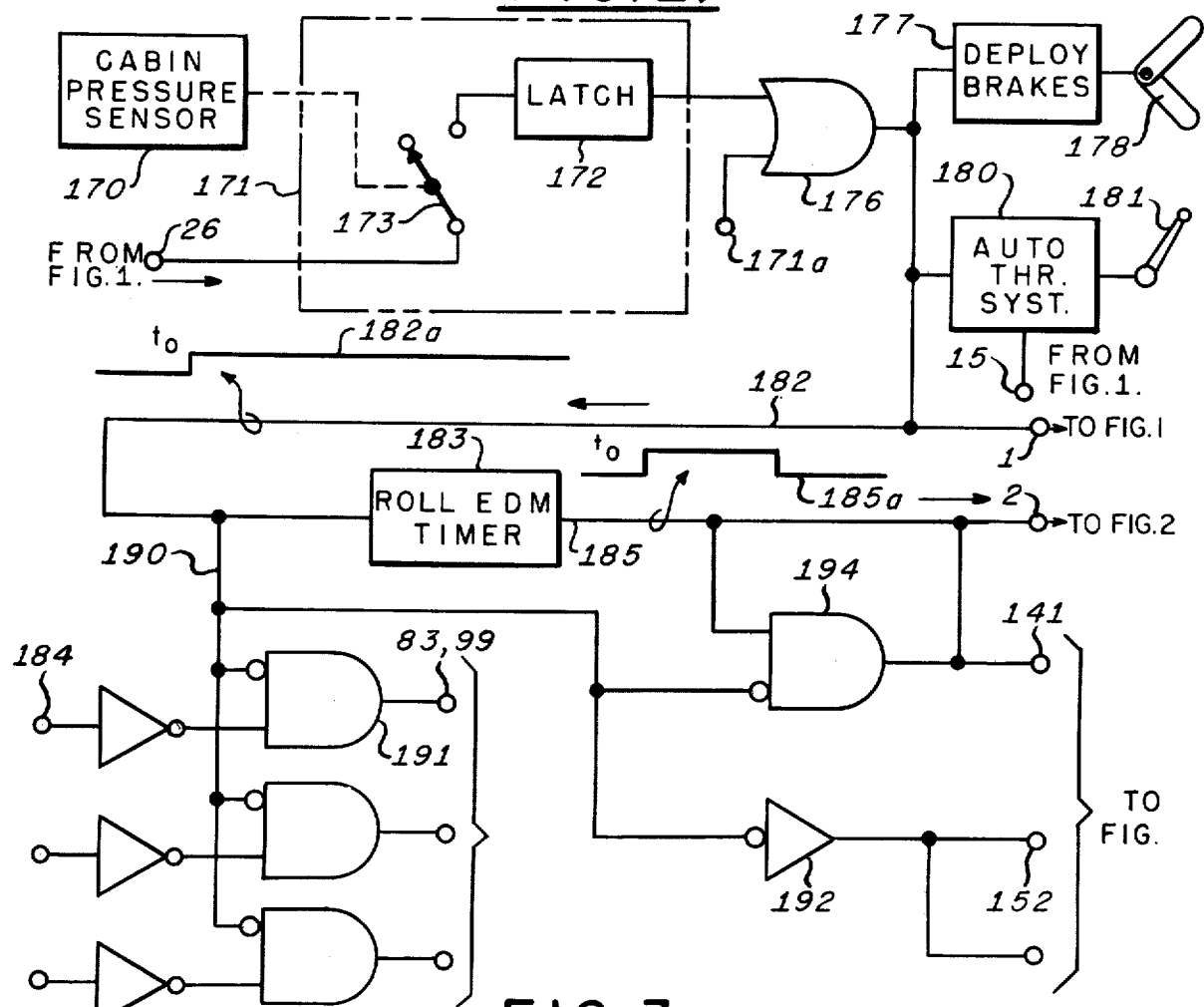
FIG. 3 is a block diagram of the sensors and control logic used in automatically initiating the emergency descent control.

Referring to FIG. 3, the essential elements of the apparatus for initiating the emergency descent mode (EDM), which may be referred to as the emergency descent mode monitor, are illustrated. This figure illustrates the sensors and timing devices for generating the control logic signal 182a on lead 182 and a time duration logic signal 185a on lead 185 whose duration is, for example, forty to fifty seconds. Signals 182a and 185a are both started simultaneously with mode initiation, signal 182a continuing until the automatic pilot is manually disengaged by the pilot at the safe low altitude and signal 185a continuing long enough to produce a substantial turn off course as will be described. The autopilot is manually initially engaged by the supply of an engage logic signal at terminal 5 in FIG. 1.

As shown in FIG. 3, two logic signal sources supply inputs to the EDM monitor 171; the first of these sources is a conventional cabin pressure sensor 170 which may comprise a simple aneroid bellows and which operates an electrical switch 173. When the cabin pressure is normal, with the pressurization system operating to maintain cabin pressure at say 10,000 feet, switch 173 is open but, upon loss of cabin pressure, switch 173 closes. The second logic signal is supplied on terminal 26 at a discrete altitude, which may be referred to as the EDM arming altitude. This logic signal is supplied from the air data computer 20 of FIG. 1. Most conventional air data computers provide a switch 27 which operates at about 28,000 feet and is used by various aircraft instruments and systems to switch from IAS to MACH airspeed. Switch 27 may therefore be conveniently used at altitudes above 28,000 feet to supply the EDM logic signal at terminal 26 of FIG. 3. Thus, with the aircraft above 28,000 feet and with normal cabin pressure, switch 27 is closed and switch 173 open so that there is no signal supplied to OR gate 176 and the autopilot pitch channel operates normally. However, upon cabin decompression switch 173 closes, providing the logic signal to gate 176 and initiating the EDM mode. A latch 172 may be provided to maintain EDM engaged until intentional disengagement by the pilot, for example, by autopilot disengage. More sophisticated switching logic may, of course, be provided. For example, in some installations it may be desired to inhibit the EDM mode for altitudes below certain altitudes or to provide initial EDM arming at, say, 28,000 to 30,000 feet and final arming at, say, 40,000 to 50,000 feet. Design of such logic may be readily provided by those skilled in the art.

In the event of sudden decompression of the aircraft cabin pressure at very high altitudes, it is unlikely that the aircraft crew can act quickly enough and can remain sufficiently conscious for the period of time required manually to control the aircraft to establish a maximum safe descent rate. Thus, engagement of EDM should be substantially instantaneous and should operate so that the craft is returned as rapidly as possible to an altitude level at which the cabin pressure value permits recovery of consciousness. Since this mode is an emergency mode, it must be highly reliable. This may be accomplished by providing one or more redundant monitor circuits 171, the outputs of each of which may be supplied to the OR logic gate 176 via lead 171a.

Returning to FIG. 3, cabin decompression above the predetermined altitude is seen to provide an output which persists until the craft has reached the safe altitude, the crew regained consciousness, and then have disengaged the autopilot. The OR gate 176 provides all EDM logic to the apparatus to be subjected to emergency control. For example, the EDM signal causes the conventional brake deploy control 177 to deploy air brakes or other aerodynamic drag producing surfaces 178 and, in those aircraft with autothrottle systems, to set the same to idle thrust, as shown schematically at 180 and 181.

In craft in which such automatic throttle control system 180 is not provided, it may be assumed that the craft engine throttles 181 have already been set by the pilot for normal cruise power before EDM initiation and, therefore, the throttles will in all likelihood remain in this condition. With this cruise power setting and with the speed brakes, 178 deployed and also with the craft flying at its design limit $V_{MO}$, as will be further discussed, a maximum safe rate of descent will ensue, say between 6,000 to 8,000 feet per minute depending upon the particular aircraft's aerodynamic characteristics. Thus, the invention will be seen to be compatible and versatile for use in aircraft, whether or not equipped with an autothrottle system, although with an autothrottle equipped aircraft, the automatic application of idle thrust will result in a greater rate of descent without exceeding $V_{MO}$.

As previously noted, the apparatus of FIG. 3 generates the respective pitch and roll channel EDM signals 182a and 185a for use in FIGS. 1 and 2. As already discussed, it is the primary object of the present invention automatically to fly the aircraft in a safe manner to a desired low altitude upon sudden or explosive decompression of the cabin. This is accomplished by immediately and automatically establishing a maximum rate-of-descent at maximum allowable airspeed $V_{MO}$ without excessive speed overshoot which might cause structural damage. During the initiation of the dive, the craft is automatically turned off course, usually a Victor air route, in order to avoid other traffic using the original route and finally to flare out and capture the desired safe altitude. A preferred embodiment of apparatus for providing these basic functions will now be described.

The pitch EDM signal of FIG. 3 is coupled at terminal 1 in FIG. 1. This signal is delayed in the delay circuit 3 by about one second (for transient protection) before application to OR gate 4. The output of OR gate 4 is applied to an AND gate 6 along with the autopilot engage signal at terminal 5, the output of which is coupled back via lead 7 to OR gate 4 so as to latch AND gate 6. Gate 6 feeds a one-shot circuit 10 which supplies a signal suitable for disengaging flight director 12 by activation of conventional switches therein and for displaying suitable warning flags 12a so that a warning that the flight director has been disconnected is provided to the pilot upon his recovery.

If the emergency descent mode were to operate so as to simply nose the aircraft over to institute a dive, airspeed would very rapidly build up and likely exceed $V_{MO}$, endangering the aircraft's structural limits. Therefore, the automatic $V_{MO}$ capture capability of the present invention is a significant safety feature.

As shown in FIG. 1, an indicated air speed signal $V_{IAS}$ is supplied from the air data computer 20 via lead 35 to summation device 37, the second input of which is a $V_{MO}$ signal via lead 36, the latter representing the maximum allowable air speed for the craft and the signals being provided with the polarities shown. The output of summation device 37 is supplied to limiter 50 limiting its output to a value, say representative of 10 knots, which assures a predetermined or programmed acceleration to $V_{MO}$ through the autopilot pitch attitude control system 70 to eliminate or substantially reduce overshoot of the desired $V_{MO}$. Thus, the output of limiter 50 is supplied to displacement gain channel 55 and integral gain channel 57 in a conventional fashion for this purpose. The output of displacement channel 55 is supplied to pitch channel and servo 70 by way of switch 54, lead 61, summation device 58, lead 60, summation device 93, and lead 90. Similarly, the output of the integral gain channel 57 is supplied to the pitch channel and servo 70 by way of switch 56, lead 92, summer 98, and lead 91. Switches 54 and 56 are closed at EDM initiate by AND gate 11 responsive to the EDM logic and an output signal supplied from an altitude flare detector 40. This logic assures that upon receipt of a flare command, as will be described, the airspeed control signals will be removed from control of the autopilot.

Through the operation of the foregoing, the aircraft has been nosed over in a controlled manner so as to safely capture $V_{MO}$. With speed brakes 178 deployed and engines at cruise setting, a substantial rate of descent will be required to achieve $V_{MO}$. With throttles set at idle thrust, an even higher rate of descent will be required.

As noted, the present invention provides means for sensing the desired low or safe altitude and for flaring the craft smoothly to this altitude and then maintaining it. Considering again the pitch channel apparatus of FIG. 1, the air data computer 20 supplies signals in accordance with existing craft altitude h and altitude rate h. These signals are supplied to the inputs of summation device 22, along with a bias signal provided by a suitable source 25 via the respective leads 23, 21, 24, poled as shown. The magnitude and polarity of the bias signal on lead 24 is selected to correspond to some predetermined safe low altitude, say 12,000 feet. The output of summation device 22 is connected via lead 39 to the pitch flare displacement gain channel 51 and thence through flare initiate switch 52, lead 53, summation device 58, lead 60, and summation device 93 via lead 90 as a command input to the pitch channel and servo 70.

The output of summation device 22 is also applied via lead 38 to flare detector 40 which is armed only by the latched EDM logic signal from junction 8. The flare detector threshold is dependent upon the relationship:

$$(h - h_B) + K\dot{h} \geq 0$$

where $h_B$ is the 12,000 foot bias and K is a flare detect constant (flare initiation altitude) which may be selected for optimum control dependent upon aircraft characteristics. Therefore, during the $V_{MO}$ rate of descent of the aircraft above the flare altitude, the logic output of the flare detector 40 on lead 42 is, say, a zero which is applied to switch 52 in a sense to maintain it open, whereby no altitude control signal is applied to the pitch channel. Also, the same zero logic output of flare detector 40 is via lead 41 inverted by inverter 43 to provide a logic one to AND gate 11 which, since the autopilot is engaged, supplies a logic one output at junction 13 to switches 54 and 56 to maintain them closed during the $V_{MO}$ descent.

Thus, the aircraft continues its maximum rate of descent until the flare altitude is reached, at which point the flare detector operates to provide a logic one output which simultaneously opens the airspeed on pitch control through opening of switches 54, 56 and institutes the altitude on pitch control through closure of switch 52. The flare path to the desired low altitude of 12,000 feet from the flare initiation point is controlled through an error signal to the pitch channel proportional to the usual asymptotic flare control relationship $(H_B - h) + K\dot{h}$. In those aircraft which have an autothrottle system, it will be recalled that, upon EDM initiation, the throttle controls set the engines to idle thrust which would not be sufficient to maintain the aircraft at the constant low altitude, especially if the speed brakes are left deployed. Therefore, the output of flare logic AND gate 11 is applied through a time delay 14 through terminal 15 to the autothrottle system 180 to set the engine thrust to that sufficient to maintain the aircraft at the 12,000 foot altitude. Although not shown in FIG. 3, it may be desirable to supply the same logic signal to the speed brake deploy mechanism 177 to restore the speed brakes 178 to their normal retracted position. Since the flare logic gate 11 operates at flare initiation, the time delay 14 is provided for the purpose of delaying the throttle control logic signal for the time necessary for the aircraft to complete its flare to the desired 12,000 foot altitude; for example, between 5 and 10 seconds, depending upon aircraft characteristics.

The third of the basic functions provided by the emergency descent control system of the present invention is automatic change of the course of the aircraft from, most likely, an established airway, so that it does not descend vertically through that airway, endangering other traffic using it. For this purpose, the roll channel control illustrated schematically in FIG. 2 is provided. Its function is to provide by means of roll EDM command 130 a fixed signal; i.e., a predetermined fixed voltage, representing a corresponding fixed roll or bank angle command applied upon EDM initiation for a predetermined period of time. Therefore, since it is well known that a predetermined bank angle produces a corresponding rate of turn, the magnitude of the turn can be predetermined by the time during which the bank command is supplied depending, of course, upon craft speed. Switch 131 is closed by supplying to terminal 2 the roll EDM logic signal 185a of predetermined time duration on lead 185. The fixed roll command voltage is then coupled through summation device 132 via lead 137 into input lead 156 of roll channel and servo 155 for a time interval dependent on airspeed sufficient to produce a change in course of about ninety degrees. A typical time period can be on the order of 40 to 50 seconds. This bank command signal cooperates with the output of roll attitude and attitude rate reference 157 in positioning roll control surface 155a in a conventional fashion. The roll control parameters are, of course, not highly critical, but a relatively steep bank angle say as great as 35° or more may be advantageous because it will tend desirably to increase the vertical speed of the craft by reducing its effective vertical lift vector.

It is clearly evident from the foregoing that upon initiation of the emergency descent mode control system of the present invention, all other autopilot control modes must be disengaged. This is accomplished by employing straight forward and generally conventional control logic operated upon EDM initiation as illustrated schematically in the figures. Briefly, a number of typical autopilot modes is illustrated; in the pitch channel they may be altitude hold 71, airspeed hold 72, and vertical speed hold 73 and in the roll channel they may be turn rate command 133, heading select-heading hold command 137, and other azimuth controls 150, such as radio navigation commands. Since the mode select-inhibit logic for these modes is generally self-evident to those skilled in the autopilot art from an inspection of the drawings, a detailed description is not necessary. However, for completeness, one mode in each channel will be briefly described.

Thus, in FIG. 1 in the altitude control mode, a signal corresponding to departures from a preselected or desired altitude is provided from altitude control 71 and is branched through conventional displacement and integral gain paths 77, 80, switches 84, 100, summers 88, 93 and 106, 98 and leads 90, 91 to the input of pitch channel and servo 70. The altitude hold mode is selected through a conventional autopilot mode select panel (not shown) which provides a mode engage logic signal to terminal 184 of FIG. 3 for controlling switches 84, 100. For purposes of incorporating the EDM mode of the present invention into the autopilot, additional mode logic 191 is provided. Thus, the EDM logic signal on lead 182 is applied via lead 190 to the inverting terminal of AND gate 194 along with the altitude engage logic from terminal 184. With the autopilot operating normally in the altitude hold mode, the output of OR gate 176 is, for example, a logical zero and therefore both inputs to AND gate 191 are, for example, logical ones, thereby providing a logic output to terminals 83, 99 of switches 84, 100 effectively closing these switches to supply any altitude error signal to pitch channel 70. Upon initiation of the EDM mode, the output of the EDM monitor 76 goes high, for example, a logical one thereby initiating the EDM mode and simultaneously this logical one causes a logical zero at AND gate 191, forcing its output low or to logical zero and inhibiting the altitude hold mode by opening switches 84, 100. The other pitch channel modes are similarly interrupted on initiation of the EDM mode.

Interruption of the roll channel mode upon EDM mode initiation is similar. For example, referring to FIG. 2 and assuming the autopilot is operating in one of the radio navigation modes, switch 153 is closed by suitable mode engage logic, (not shown) supplying a control signal from command source 150 through displaced gain 151 (an integral gain path may also be provided), switch 153, lead 144, summer 143, and lead 138 to roll channel 155. Upon EDM initiation, the high logic output of the EDM monitor on lead 182 is inverted as at inverter 192 and applied to switch terminal 152 to deenergize or open switch 153, interrupting the mode. However, it will be noted that in the roll channel it may be desirable that upon completion of the turn off course provided by timer 183, the roll channel be placed in the heading hold mode. Thus, the signal from heading hold command 139 is applied through displacement gain channel 140, switch 142 (through suitable mode engage logic circuit similar to logic gate 191), and lead 146 to summer 143 and thence to the roll channel servo 155. Upon EDM initiation, the high logic on lead 182 is applied to both the roll timer 183 and to the invert input of a further AND gate 194, the non-invert input of which is connected to the roll timer output. Since this output goes high with EDM initiation, the logic output of gate 194 will be low and heading hold mode switch 142 will be opened via terminal 141. However, the turn is terminated by the roll timer output going low which, in turn, produces a high signal at the output of gate 194 to turn switch 142 back on. Thus, after completion of the turn, the heading hold mode is reengaged and the craft will stay on the new heading or course during the descent to and following the capture of the safe low altitude.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an automatic flight control system for aircraft having a signal-responsive pitch control channel for controlling the aircraft pitch attitude, an automatic emergency descent control apparatus for automatically controlling the descent of the aircraft to a predetermined safe low altitude upon cabin decompression at a very high altitude, said emergency descent apparatus comprising:
   first switch means responsive to the altitude of the aircraft,
   second switch means responsive to the air pressure within the aircraft cabin,
   means responsive to said first and second switch means for providing an initiation signal for said apparatus when said aircraft is above a predetermined altitude and when said cabin pressure decreases below its normal pressure,
   airspeed responsive means for providing a control signal corresponding to a maximum operating airspeed for said aircraft, and
   means responsive to said initiating signal for supplying said airspeed control signal to said pitch control channel for controlling the craft pitch attitude to achieve said maximum operating airspeed.

2. The emergency descent control apparatus as set forth in claim 1 further including limiting means responsive to said airspeed control signal for limiting the signal to said pitch control channel to a predetermined value whereby to limit the acceleration of said aircraft to said maximum operating airspeed.

3. The emergency descent control apparatus as set forth in claim 1 wherein said aircraft includes aerodynamic drag producing surfaces and wherein said apparatus includes further means responsive to said initiating signal for deploying said drag producing surfaces.

4. The emergency descent control apparatus as set forth in claim 1 wherein said aircraft includes autothrottle control means for controlling the aerodynamic thrust on said aircraft and wherein said apparatus includes further means responsive to said initiating signal for controlling said autothrottle control means to reduce said thrust to a minimum value.

5. The emergency descent control apparatus as set forth in claim 1 wherein said aircraft flight control system includes a signal responsive roll control channel for controlling the roll attitude of the aircraft and wherein said apparatus further includes means responsive to said initiating signal for supplying a bank angle command signal to said roll control channel thereby to alter the course of the aircraft.

6. The apparatus as set forth in claim 5 wherein said further means includes timing means responsive to said initiating signal for supplying said bank angle command signal to said roll channel control for a predetermined time period and thereafter removing the same whereby to limit course change in accordance with said time period.

7. The apparatus as set forth in claim 6 wherein said roll control channel includes a plurality of course control means including means for maintaining said aircraft on a predetermined heading and wherein said apparatus includes further means responsive to said initiating signal for disengaging all of said course control means from said roll control channel and substituting said bank angle command signal therefore and means responsive to said timing means for removing said bank angle command signal and reengaging said heading maintaining means.

8. The apparatus as set forth in claim 1 further comprising
   aircraft altitude control means including means for supplying signals corresponding to the instantaneous actual altitude and altitude rate of the aircraft,
   altitude bias means for supplying a signal corresponding to said predetermined safe low altitude:
   means responsive to said altitude bias, said actual altitude and said altitude rate signals for providing a flare control signal,
   flare detector means also responsive to said altitude bias, said actual altitude and said altitude rate signals for supplying a flare detect signal when the difference between said actual altitude and said bias signal substantially equals said altitude rate signal,
   means responsive to said initiating signal for rendering said flare detector means effective, and
   means responsive to said flare detect signal for disconnecting the supply of said airspeed control signal to said pitch control channel and for supplying said flare control signal thereto.

* * * * *